United States Patent [19]

Black et al.

[11] Patent Number: 4,654,250

[45] Date of Patent: Mar. 31, 1987

[54] COMPOSITE CAULKING

[76] Inventors: Robert J. Black, 9123 W. 113th St., Overland Park, Kans. 66210; Norman H. Brown, 2136 E. 151st St., Olathe, Kans. 66062; Alfred J. Paradise, 9719 Juniper, Overland Park, Kans. 66207

[21] Appl. No.: 713,338

[22] Filed: Mar. 18, 1985

[51] Int. Cl.[4] .......................... B32B 27/08; C09J 7/02
[52] U.S. Cl. ...................................... 428/195; 428/336; 428/343; 428/352; 428/355; 428/480; 428/906
[58] Field of Search ................ 428/40, 343, 198, 906, 428/352, 355, 480, 336; 52/287, 288, 717.11; 502/159

[56] References Cited

U.S. PATENT DOCUMENTS

| | | | |
|---|---|---|---|
| 1,960,137 | 5/1934 | Brown | 428/40 |
| 2,303,864 | 12/1942 | Reasor | 52/717.11 |
| 2,541,768 | 2/1951 | Keller | 52/287 |
| 3,200,547 | 8/1965 | Johnson | 52/288 |
| 3,271,232 | 9/1966 | Moore | 502/159 |
| 3,916,051 | 10/1975 | Wakeman | 428/198 |
| 4,530,867 | 7/1985 | Garman | 428/198 X |

Primary Examiner—Thomas J. Herbert
Attorney, Agent, or Firm—Kokjer, Kircher, Bradley, Wharton, Bowman & Johnson

[57] ABSTRACT

A caulking tape for sealing joints such as around bath tubs and shower bases. A bead of butyl rubber based sealant permanently adheres to one side of a flexible strip of opaque polyester film. The tape is wound in a spiral roll and one side of the polyester strip is coated with a siliconized release agent from which the sealant releases to permit the tape to be drawn off of the roll for use. The bead of sealant is set back from the edges of the carrier strip so that it does not squeeze past the strip when the tape is applied and pressed against the joint. When the tape is fully applied to the joint, the sealant provides an effective seal and is completely covered by the attractive polyester strip to enhance the appearance of the caulked joint.

18 Claims, 5 Drawing Figures

U.S. Patent  Mar. 31, 1987  4,654,250
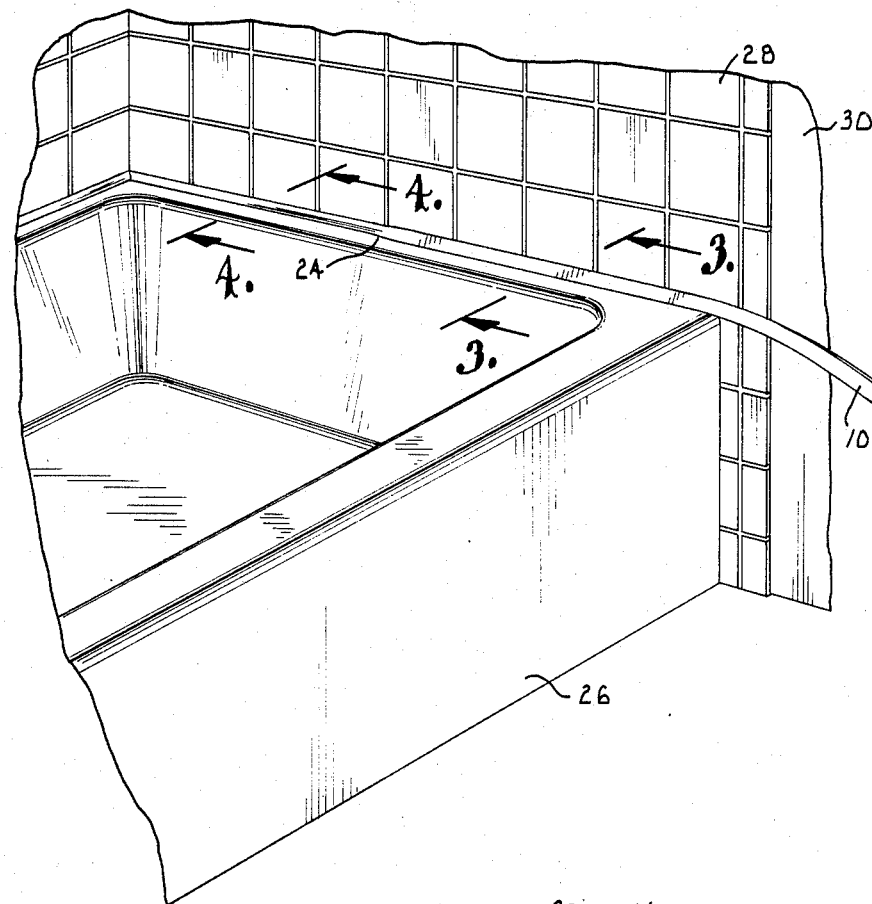
Fig. 1.
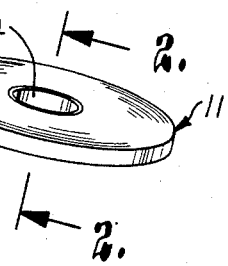
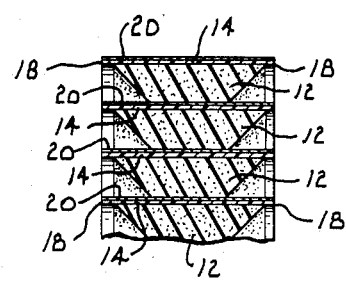
Fig. 2.
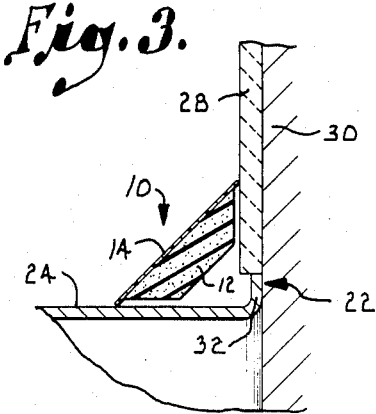
Fig. 3.
Fig. 4.
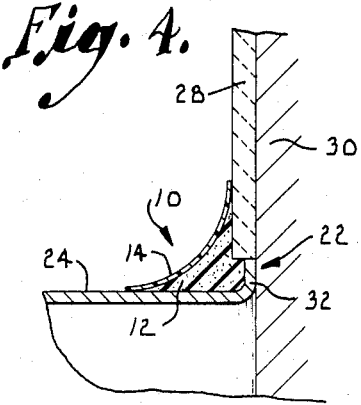
Fig. 5.

COMPOSITE CAULKING

BACKGROUND AND SUMMARY OF THE INVENTION

This invention relates in general to caulking products and more particularly to a caulking tape in the form of a pliable sealant and an attractive polyester strip which carries the sealant and covers it when the tape is applied to caulk a joint.

It is common practice for the joints around bathtubs and shower bases to be caulked in order to seal them against moisture. Typically, a latex caulking compound is applied to the joints from a squeeze tube or sometimes from a cartridge which is activated by a hand held caulking gun. The same procedure is often followed to seal other joints such as those between sinks and walls, counters and walls, vanity tops and walls, inside corner areas in shower stalls and other intersecting surfaces both inside and outside of buildings.

The manner in which the caulking compound is applied has resulted in numerous problems that detract both from the appearance of the caulked joints and from the effectiveness of the seal. Accurate and uniform application of a bead of caulk from a squeeze tube is difficult at best. Consequently, some parts of the joint receive an insufficient amount of caulking compound, while other parts receive an excessive amount of caulk. Even if the caulking compound is applied properly and uniformly, it is visible along the entire length of the joint and is not particularly attractive even when it is in good condition. The appearance of the caulk can become especially objectionable after it has dried out or been discolored or otherwise damaged by mildew, ultraviolet light, cleaning chemicals and/or other chemical agents. Clean up following application of the caulk is another problem. Although rigid molding strips and other rigid trim pieces of various types have been proposed for covering of the joint, they have not been successful for a variety of reasons, most notably because of their inability to conform to irregularities that often exist.

The present invention is directed to an improved caulking product which can be applied to joints more easily and accurately than conventional caulking compounds and which is both more attractive and more effective in its sealing capabilities than conventional caulks. In accordance with the invention, a flexible caulking tape is preformed and is wound in a spiral roll from which it can be drawn as needed for use. The tape includes an opaque strip of polyester film which carries a pliable sealant on one side. The sealant is preferably a high tack butyl rubber based composition. The opposite side of the strip is coated with a silicone release agent from which the sealant releases to permit the tape to be withdrawn from the spiral roll and used.

The tape is used by first properly aligning it with the joint that is to be sealed and then pressing it firmly against the joint to permanently hold it in place. Pressing of the tape squeezes the butyl rubber sealant beneath the overlying polyester film in order to effectively seal the joint. The sealant is carried on the tape in the form of a uniform bead which is set back from the edges of the strip and is gradually tapered as it extends away from the film. This tapered configuration of the bead conforms generally with the geometry of right angle joints such as those between a bathtub rim and an adjacent wall, and the set back of the bead from the edges of the strip permits the sealant to be squeezed into the joint to effectively seal it without appreciable amounts of sealant leaking past the tape edges. When the tape has been fully applied to seal the joint, the sealant is completely covered by the opaque polyester strip which is waterproof, weatherproof, easily cleaned and substantially unaffected by mildew, ultraviolet light or chemicals. Consequently, the joint is sealed in a uniform and effective manner and the only visible part of the joint is the attractive polyester strip.

BRIEF DESCRIPTION OF THE DRAWINGS

In the accompanying drawing which forms a part of the specification and is to be read in conjunction therewith and in which like reference numerals are used to indicate like parts in the various views:

FIG. 1 is a perspective view showing the manner in which the caulking tape of the present invention can be applied to seal a joint between a bathtub and an adjacent tile wall;

FIG. 2 is a fragmentary sectional view of an enlarged scale taken through the roll of tape generally along line 2—2 of FIG. 1 in the direction of the arrows;

FIG. 3 is a fragmentary sectional view of an enlarged scale taken generally along line 3—3 of FIG. 1 in the direction of the arrows;

FIG. 4 is a fragmentary sectional view taken generally along line 4—4 of FIG. 1 in the direction of the arrows; and FIG. 5 is a fragmentary sectional view similar to FIG. 4 but showing the caulking tape applied to a joint that has previously been caulked.

DETAILED DESCRIPTION OF THE INVENTION

Referring now to the drawing in more detail, the present invention provides a flexible caulking tape 10 which is wound in a spiral roll 11 having a hollow core 11a formed by cardboard or a similar material. The tape 10 has two basic components, a polymer based sealant 12 and a flexible strip 14 of polyester film on which the sealant 12 is carried.

The sealant 12 is a butyl rubber based composition which is sufficiently pliable to be squeezed into the types of joints that are to be sealed by tape 10. Preferably, the sealant 12 has the following composition: 9-13 parts of an isoprene-isobutylene copolymer; 0.25-1 part of a hindered phenolic anti-oxidant; 2.5-5 parts of a white pigment; 0.5-3 parts of barium metaborate monohydrate mildecide; 5-7.5 parts of a hydrocarbon resin; 0.5-1 parts of an oleic acid; 25-40 parts of a finely ground calcium carbonate; 20-30 parts of polybutene; 7.5-10 parts of a precipitated silica; and 10-15 parts of calcium metasilicate of a wollastonite type. A sealant having this composition is particularly effective in its sealing abilities and at the same time is pliable enough to conform to irregular shapes. The sealant 12 is also resistant to mildew, primarily because of the presence of the mildecide.

The carrier strip 14 is preferably an opaque polyester film which is highly flexible in order to conform to irregular shapes. The polyester film is also tough and durable and is waterproof and resistant to ordinary chemicals and to ultraviolet light and other weather related effects that degrade many materials. The polyester film is resistant to mildew and can be attractively colored to complement the colors which surround the joint that is to be caulked. Films having a thickness of 1 mil or even less are preferred.

The sealant 12 is laminated by extrusion onto one surface of the strip 15. The surface which carries the sealant 12 is the inside surface of the film when the tape is wound on the roll 11. The butyl rubber sealant is highly tacky and thus permanently adheres to the surface of the polyester strip 14.

The sealant 12 is carried on the strip 14 in the form of a bead which gradually tapers as it extends away from the strip. The sealant 12 is also set back somewhat from both of the opposite edges 18 of strip 14. By way of example, the strip 14 can have an overall width of ⅝ inch, and the sealant 12 can be set back 1/16 inch from each of the edges 18. The angle of taper of each side of the sealant bead is preferably about 45° in order to conform generally to the geometry of joints formed by the right angle intersection between two surfaces. The bead of sealant is preferably about ⅛ inch thick. A coating 20 of a suitable release agent is applied to the outer surface of strip 14 or the surface opposite the surface that carries the sealant 12. The release coating 20 in each layer of the spiral 12 is in contact with the sealant 12 of the immediately adjacent outer layer of tape, as best shown in FIG. 2. The sealant 12 is releasable from the coating 20 so that tape 10 can be drawn off of the roll 12 when needed for use. The coating 20 is preferably a siliconized composition which adheres to the polyester and releases from the sealant.

In a typical application, the caulking tape 10 is used to seal a joint 22 formed between the rim 24 of a bathtub 26 and wall tile 28 which covers a vertical wall 30 adjacent to the bathtub rim. As best shown in FIGS. 3–5, the bathtub rim 24 may have an upturned lip 32 which generally butts against the tile 28 at the joint 22. Prior to application of the tape, the joint 22 should be cleaned to remove soap film, mildew, dirt and other undesirable materials.

In order to caulk the joint 22, the tape 10 is drawn off of the roll 11 as needed, with the release coating 20 permitting the sealant 12 to release from the outer surface of the strip 14 as the tape is pulled from the rod. The tape is first properly aligned with the joint 22 as shown in FIG. 3. It is noted that the tapered profile of the sealant bead permits its opposite sides to conform generally with the adjacent surfaces of the bathtub rim 24 and tile 28. When the tape has been properly aligned, it can be cut to the proper length, and it is gradually bent into the corner area of joint 22 and pressed and smoothed against the joint. The pressing and smoothing action is carried out by applying the finger against the outer surface of the polyester strip 14 and working the finger along the joint.

As the tape is pressed into the joint, the pliable sealant 12 is squeezed into the joint area beneath the strip 14. Thus, as best shown in FIG. 4, the sealant is pressed against the adjacent surfaces of the rim 24 and tile 28 to permanently and effectively seal the joint 22 against moisture. Because the sealant 12 is set back from the edges 18 of strip 14, little if any of the sealant is squeezed out past the tape edges.

When the tape 10 has been fully applied to the joint 22, the strip 14 extends along the entire length of the joint and completely covers the underlying sealant 12. As previously indicated, strip 14 is opaque so that it completely shields the sealant from view. The strip can be a white color or any other desired color, and it presents a much more attractive appearance than typical caulking compounds. In addition, the strip is resistant to mildew and is waterproof in order to assist in preventing water from entering the joint 22. The sealant 12 is also resistant to mildew so that the caulking tape 10 essentially provides permanent caulking of the joint 22.

Any portion of the tape 10 that is not used remains on the roll 11 and can be used in the future. It is pointed out that the caulking tape 10 can be used to seal virtually any other type of joint, both inside and outside of buildings, and its weather resistant characteristics are particularly beneficial in outside applications.

As previously indicated, polyester film is particularly desirable for use as the material of which the strip 14 is constructed. The polyester strip 14 is preferably about one mil thick and can be as little as one half mil thick and still provide the necessary strength and durability.

FIG. 5 shows application of the caulking tape 10 to a joint 22 which has previously been caulked. The old caulking compound 34 is covered by the new sealant 12 and the polyester strip 14. Thus, it is not necessary to remove the old caulking compound 34 prior to application of the sealing tape 10.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. A caulking product for sealing a joint, comprising a flexible tape wound in a continuous spiral roll and including a bead of pliable sealant characterized by inherent tackiness and the ability to flow into and caulk the joint and an elongate strip of flexible film having opposite sides, said sealant being carried on and permanently adhering to one side of said strip and the opposite side of said strip being coated with a release agent from which the sealant in the adjacent layer of the roll is releaseable to permit the tape to be drawn off of the spiral roll and applied to the joint with said sealant acting to caulk the joint and said strip extending along the joint and covering the sealant.

2. The invention of claim 1, wherein said film is opaque.

3. The invention of claim 1, wherein said film comprises waterproof polyester.

4. The invention of claim 1, wherein said film is no more than about 1 mil thick.

5. The invention of claim 1, wherein said sealant comprises a butyl rubber based composition.

6. The invention of claim 1, wherein said release agent comprises a siliconized composition.

7. The invention of claim 1, wherein said strip has opposite edges and said bead of sealant is set back from each edge.

8. The invention of claim 7, wherein said bead tapers as it extends away from the strip.

9. In a caulking tape wound in a spiral roll, the combination of:

an elongate flexible strip of polyester film having opposite first and second surfaces, said strip being opaque and terminating in opposite side edges;

a bead of pliable polymer based caulking sealant carried on and permanently adhering to said first surface of the strip and extending substantially continuously along the length thereof, said bead being set back from said edges of the strip and said sealant being characterized by inherent tackiness and the ability to flow into and caulk a joint to be sealed; and a release coating on said second surface of the strip from which the sealant in the adjacent layer of the roll is releaseable when the tape is drawn off of said roll, whereby the tape can be drawn off of said roll and applied to the joint to be sealed with said sealant acting to caulk the joint and said strip covering the sealant and shielding same from view.

10. The invention of claim 9, wherein said bead tapers as it extends away from the strip.

11. The invention of claim 9, wherein said release coating is a siliconized coating.

12. The invention of claim 9, wherein said sealant is a butyl rubber based compound.

13. The invention of claim 9, wherein said film is no more than about 1 mil thick.

14. A caulking product for sealing a joint between intersecting surfaces, comprising:

an elongate flexible strip of opaque polyester film having opposite first and second surfaces and opposite edges;

a bead of pliable caulking sealant carried on and permanently adhering to said first surface of the strip and characterized by inherent tackiness and the ability to flow into and caulk the joint, said bead being set back from each edge of said strip and tapering away from the strip to facilitate application of the sealant to the joint;

said strip and sealant cooperating to form a flexible tape wound in a spiral roll with the sealant in each tape layer contacting said second surface of the strip in the adjacent tape layer; and a release coating on said second surface of the strip from which the sealant in the adjacent tape layer is releaseable, whereby the tape can be drawn from the roll and applied to the joint with said sealant acting to caulk the joint and said strip extending along the joint and covering the sealant.

15. The invention of claim 14, wherein said film is no more than about 1 mil thick.

16. The invention of claim 14, wherein the film is waterproof.

17. The invention of claim 14, wherein said sealant comprises a butyl rubber based composition.

18. The invention of claim 14, wherein said release coating is a siliconized composition.

* * * * *